March 24, 1970   C. W. BORDEN   3,502,527
METHOD OF MAKING A HELICALLY GROOVED REINFORCED HOSE
Filed May 12, 1967
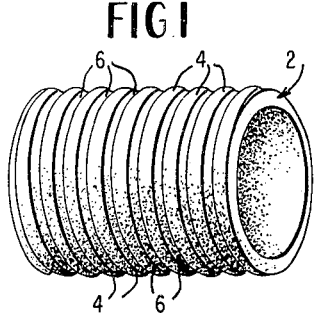
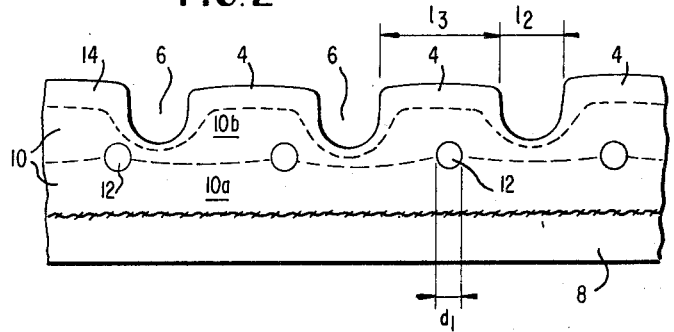
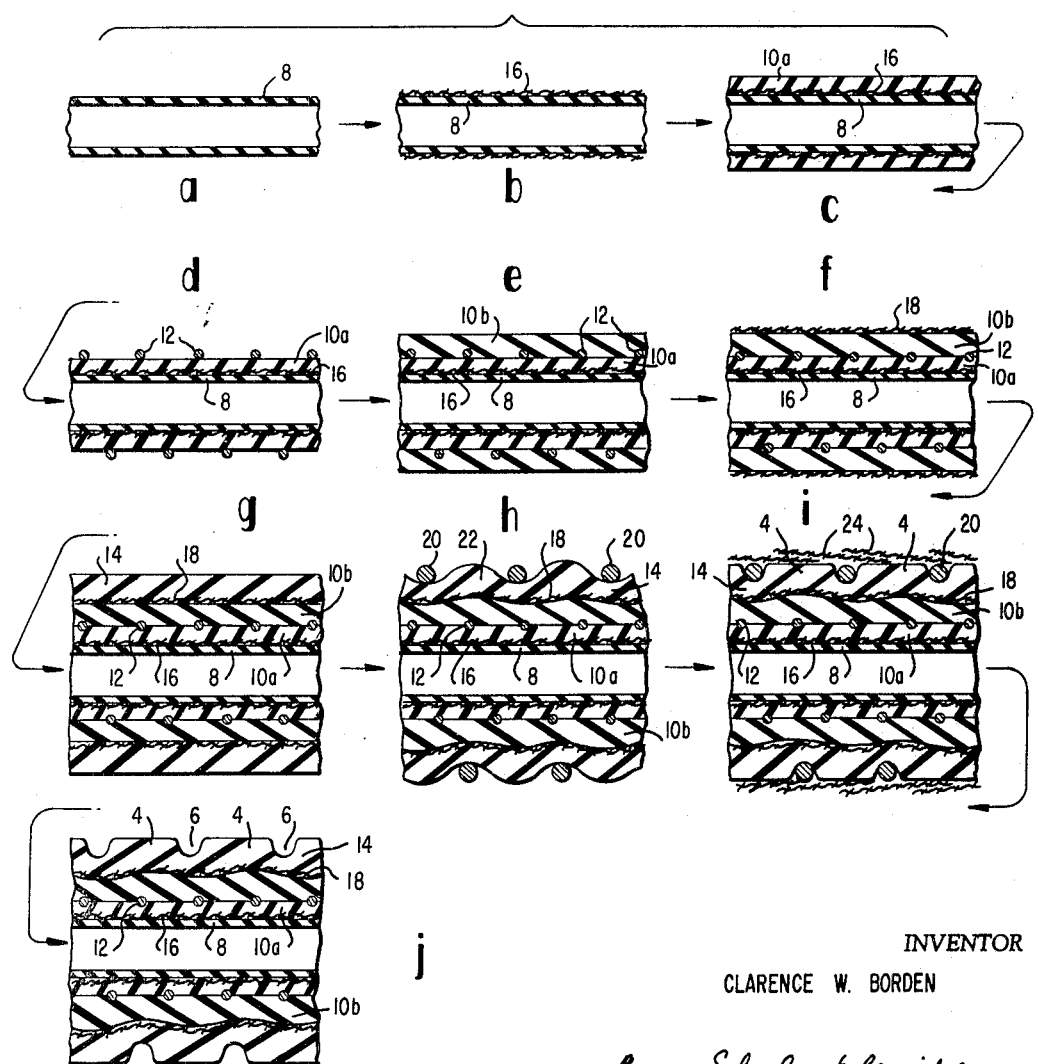
INVENTOR
CLARENCE W. BORDEN
BY Browne, Schuyler & Beveridge
ATTORNEYS

United States Patent Office 3,502,527
Patented Mar. 24, 1970

3,502,527
METHOD OF MAKING A HELICALLY GROOVED REINFORCED HOSE
Clarence W. Borden, Trenton, N.J., assignor to Goodall Rubber Company, Trenton, N.J.
Filed May 12, 1967, Ser. No. 638,004
Int. Cl. B31c 3/00
U.S. Cl. 156—143  12 Claims

ABSTRACT OF THE DISCLOSURE

A helically grooved hose has successive layers of elastomeric material, braided fabric and helical reinforcement wire. The helical grooves or depressions do not extend between the convolutions of the reinforcement wire due to their location radially outwardly thereof. The outwardly extending projections which lie between the depressions are substantially flat.

The method includes steps of helically wrapping a cord around a hose body which has an outer layer of moldable plastic material and then wrapping the corded hose with a flexible sheet material which flattens the projections between adjacent convolutions of the cord. The corded, wrapped hose is then cured in order to retain the desired shape.

BACKGROUND OF THE INVENTION

This invention pertains to hose of the type having a grooved or corrugated outer surface, and to a method for making such hose.

In the prior art, it is known to manufacture a hose by building up successive layers of material in a manner which will result in an outer surface which is grooved to present a corrugated appearance. Commonly, such hose incorporates an embedded, helically wound reinforcing member which is located at an axial position intermediate the grooves or depressions in the hose. A recent patent which is exemplary of this general construction is U.S. Patent 3,047,026 which issued on July 31, 1962 to Marvin M. Kahn. Another physical characteristic of the prior art hose of this type is that the outer grooved surface has generally rounded or peaked projections which lie intermediate the grooves.

It has been the practice in manufacturing hose of this general type to produce the grooves or depressions by helically winding a rope or cord around the hose body when the hose material, usually an uncured elastomeric material, is still in a moldable plastic state. This procedure results in peaked or rounded projections so that, in use, the wear of the hose due to abrasive action occurs at a concentrated point at the center of each projection.

Certain difficulties inherent in the manufacture and use of prior art hose are eliminated by the invention disclosed herein. For example, where it has been common to produce the outer grooves or depressions by winding a cord between convolutions of the embedded reinforcing material, certain technical problems have arisen in maintaining the accurate spacing of the cord. The present invention eliminates such difficulties since the cord need not bear any phased relationship to the embedded reinforcing material.

Another example of the problems of the prior art concerns the shape of the outer projections which, as mentioned above, have been generally rounded or convex outwardly. This known construction results in excessive and concentrated wear at the outermost portions of the hose. This invention seeks to eliminated such concentrated wear by providing relatively flat projections which distribute more evenly the wear occurring in the normal usage of the hose. This feature also has an important aspect in the process of manufacturing the hose, since the process described herein is particularly adapted to produce the flattened projections which were unattainable when using methods known in the prior art.

SUMMARY

The product of this invention is a flexible reinforced hose built up of successive layers of elastomeric material and incorporating an embedded helical reinforcing member. The outer layer of elastomeric material has a plurality of radially extending projections which have substantially flat outermost surfaces aligned with the central axis of the hose. The depressions which lie intermediate the projections do not extend inwardly beyond the helical reinforcing member. Other features of importance which may be incorporated into the hose of this invention are that (1) the helix angle of the depressions is unequal to the helix angle of the reinforcing member; (2) the axial extent of the depressions is no more than seven-tenths the axial extent of the projections; and (3) the miscellaneous size and thickness relationship described more fully in the description of the preferred embodiments.

A principal advantage of the described hose construction is that it provides a longer-wearing hose of built up construction due to the flat projections employed. Another advantage is that the hose may be manufactured more easily because the alignment of the depressions or grooves and the helical reinforcing member is not of critical importance to the strength and satisfactory performance of the hose.

The method of making the hose, in its broad aspect, includes the steps of indenting the outer covering of the hose to make depressions between which there are projections having convex outer surfaces, and then flattening the outer convex surfaces while the material remains moldable in order to provide superior wear-resisting characteristics in the hose. Then, the hose is cured in a conventional manner so that it becomes dimensionally stable and maintains the desired configuration. Other important features of the method involve the steps of producing indentations by wrapping a cord around the hose in a helical fashion so that its helix angle is unequal to the helix angle of any embedded wire reinforcement, and the flattening of the projections by wrapping a fabric around the corded hose.

The objects of this invention are to solve the problems inherent in the prior art and defined in the background of the invention.

BRIEF DESCRIPTION OF THE DRAWING

The drawings are illustrative of only one of many possible embodiments of the invention.

FIG. 1 is a perspective view of the completed product of the invention;

FIG. 2 illustrates the longitudinal profile of one wall of the completed product, with sectioning lines removed for clarity of illustration; and FIG. 3 shows the hose passing through the various steps of its manufacture, with the thickness of the layers exaggerated for illustrative purposes.

DESCRIPTION OF THE PREFERRED EMBODIMENT

Referring to FIG. 1, it will be observed that the product of this invention is a tubular hose 2 which has an outer surface formed of a plurality of radially and circumferentially extending flattened projections 4 which are separated by the circumferentially oriented depressions 6. For convenience of manufacture, it is desirable that the projections 4 and grooves 6 be disposed in a helical manner around the hose so that the projections are all continuations of a single raised projection.

In FIG. 2 it will be seen that the wall of the hose includes an interior layer 8 of elastomeric material, an intermediate layer or layers 10 of elastomeric material enclosing a helically wound reinforcement member 12, and an outer layer 14. Each of the layers 8, 10 and 14 is united to the adjacent layer. The layers may be partially separated by a fabric material which is preferably braided and which may have openings of sufficient dimensions to permit contact of the adjacent layers of elastomeric material. The term "fabric material" as used herein includes but is not exclusive to braided, knit and woven material suitable for use as hose reinforcement. FIG. 2 also illustrates the relationship between the depressions 6 and the reinforcing member 12 in that the depressions are located radially outwardly of the reinforcing member 12. The relative dimensions between the projections 4 and the depressions 6 are such that the axial extent of the depressions ($l_2$) is no more than seven-tenths of the axial extent ($l_3$) of the projections.

It will be recognized by an inspection of FIG. 2 that the spacing between the convolutions of the reinforcing member 12 is different from the spacing between the convolutions of the depression 6, and concomitantly that the helix angles of the reinforcing member 12 and the depression 6 are unequal. This does not sacrifice any strength in the hose and it greatly simplifies the process of its construction. In fact, the out-of-phase relationship between reinforcing member 12 and the depressions 6 results in strengthening of the hose in some locations where it provides reinforcement at points of minimum wall thickness, unlike the construction known in the prior art. The depth of each of the depressions 6 is approximately as great as its axial dimension ($l_2$).

The method of manufacturing the hose is generally disclosed in FIG. 3. Initially, the internal liner 8 is extruded to the desired diameter and wall thickness so that it appears as shown in FIGS. 3a. As used in this specification, the terms "tubular" and "tube" are intended to encompass any elongated bodies with central longitudinal passages, and not only those having a circular transverse cross section. This tube 8 is placed on a mandrel and delivered to a braiding machine where it is first wiped with a solvent to remove all foreign particles. Then, the fabric layer 16 is applied by suitable equipment such as the first deck of a braiding machine where conventional rubber cement is applied with the braid. Next, a layer 10a of raw or uncured rubber is applied exteriorly of the braid 16.

The next phase of manufacture involves the application of the helical reinforcing member 12 so that the product appears as shown in FIG. 3d. Another layer 10b of raw rubber is applied to complete the intermediate layer 10 which is illustrated in FIG. 2. The hose is then passed again through a braiding machine where a second layer of fabric 18 and a rubber cement are applied so that the product appears as shown in FIG. 3f.

After the solvents of the rubber cement are permitted to evaporate, a relatively thick outer layer 14 is applied as shown in FIG. 3g. This layer is also in a raw or uncured state so that it is a moldable plastic mass. A cord 20 is then wound helically under tension around the composite body as shown in FIG. 3h in order to provide depressions and the generally convex projections 22. A suitable diameter for the cord 20 may be selected by considering the thickness of the outer layer 14, the overall diameter of the hose and the service requirements to which it will be subjected. Cords ranging in diameter from ⅛ inch to ½ inch have been used successfully. Then, as illustrated in FIG. 3i, an outer covering or sheet of fabric 24 is wrapped under tension over the composite body to further embed the cord 20 and to displace portions of the material forming the projections 22 against the axially facing surfaces of the cord 20. This results in the flattening of the projections 22 to the shape generally illustrated in FIG. 3i. The steps shown in FIGS. 3h and 3i, which may occur simultaneously, also result in some displacement between the inwardly located layers of the material, and the forcing of some of the plastic material through the fabric layers in order to bond the hose together more securely.

The final step in the processing of the hose involves subjecting it to a vulcanizing or curing step which will change the physical characteristics of the moldable plastic material until it becomes dimensionally stable and resilient. The wrapping material 24 and the cord 20 are then removed so that the product appears generally as shown in FIGS. 1, 2 and 3j.

Of course, it is expected that a wide latitude of materials and dimensions may be employed in the practice of this invention. The elastomeric material may be natural rubber, synthetic rubber of other organic polymeric materials which exhibit physical characteristics of strength, resilience and flexiblity. Synthetic rubbers which may be used include buna-S, buna-N, neoprene or other physically related materials. The reinforcing member 12 may be of galvanized wire, coated wire or synthetic materials which posses the requisite strength and durability characteristics. The diameter ($d_1$ of the wire reinforcing should not exceed one-half the axial extent ($l_2$) of the depressions.

The cord 20 may be of natural or synthetic fibers, or it may be of solid construction. In practice, the use of nylon rope has been found to be extermely useful since this material shrinks when subjected to the heat employed in curing many elastomeric materials. When this shrinkage occurs, it naturally will embed the cord 20 more deeply in the outer layer 14.

It is apparent from the foregoing specification that the invention disclosed herein represents a significant departure from the prior art, producing a superior product and a more convenient manufacturing process.

I claim:

1. A method of manufacturing flexible reinforced hose from a tubular body which is supported on a mandrel and has at least its exterior portions formed of curable elastomeric material in a moldable uncured state, comprising the steps of
   (a) indenting with an indenting member the outer surface of said tubular body at spaced apart areas to reduce the wall thickness of said body at localized areas between which lies a projection having a convex outer surface, and flattening the convex outer surface of said projection while said indenting member is in contact with said tubular body; and
   (b) curing said tubular body until it arrives at a state where it is dimensionally stable.

2. The method according to claim 1 in which said indenting member is an elongated cord, and in which the flattening step of (a) produces flow of portions of the moldable tubular body into contact with the surfaces of the cord which face axially of the tubular body.

3. The method according to claim 2 in which the flattening step of (a) of claim 1 is performed by wrapping the tubular body with a flexible sheet member under tension.

4. A method of manufacturing flexible reinforced hose by building said hose on a mandrel comprising the steps of
   (a) placing a tubular body of curable elastomeric material in a moldable uncured state on a mandrel;
   (b) helically winding a cord on said tubular body to produce a continuous helical depression and a raised projection which is convex in longitudinal cross section, and flattening the convex projection by applying a wrapping sheet under tension to the tubular body; and
   (c) curing said tubular body of moldable material until it arrives at a state at which it is dimensionally stable.

5. A method according to claim 4 in which said cord is of a material which shrinks upon being subjected to heat, including the step of curing said tubular body by subjecting it to a temperature at which said cord shrinks to indent further said tubular body of moldable plastic material.

6. A method of manufacturing flexible reinforced hose by building said hose on a mandrel, comprising the steps of
 (a) applying a first tubular body of elastomeric material over said mandrel;
 (b) helically winding an elongated reinforcing member over said first tubular body;
 (c) applying a second tubular body of elastomeric material outwardly of the reinforcing member, said second tubular body being in a moldable uncured state;
 (d) helically winding a cord on said second tubular body to produce a continuous helical depression and a raised projection having a convex outer surface in longitudinal cross section; and wrapping said second tubular body and said cord with a sheet under tension to flatten said projection,
 (e) curing said uncured elastomeric material while maintaining said sheet under tension until the second tubular body arrives at a state at which it is dimensionally stable.

7. A method according to claim 6 in which the cord winding step (d) is accomplished by winding the cord at a helix angle which is unequal to the helix angle of the reinforcing member.

8. A method according to claim 6 including the step of applying a layer of reinforcing fabric within said first tubular body.

9. A method according to claim 8 including the step of applying a layer of reinforcing fabric within said second tubular body.

10. A method according to claim 1 including the step of removing the indenting member after the curing step.

11. A method according to claim 4 including the step of removing the cord and sheet after the curing step.

12. A method according to claim 6 including the step of removing the cord and sheet after the curing step.

References Cited

UNITED STATES PATENTS

| 2,644,487 | 7/1953 | Schindler et al. | 138—121 |
| 1,797,193 | 3/1931 | Kimmich | 138—122 XR |
| 2,430,081 | 11/1947 | Roberts et al. | 264—229 XR |
| 2,073,335 | 3/1937 | Connell | 138—122 |

PHILIP DIER, Primary Examiner

U.S. Cl. X.R.

138—122; 156—162, 171, 196; 264—294, 296